United States Patent Office 2,799,947
Patented July 23, 1957

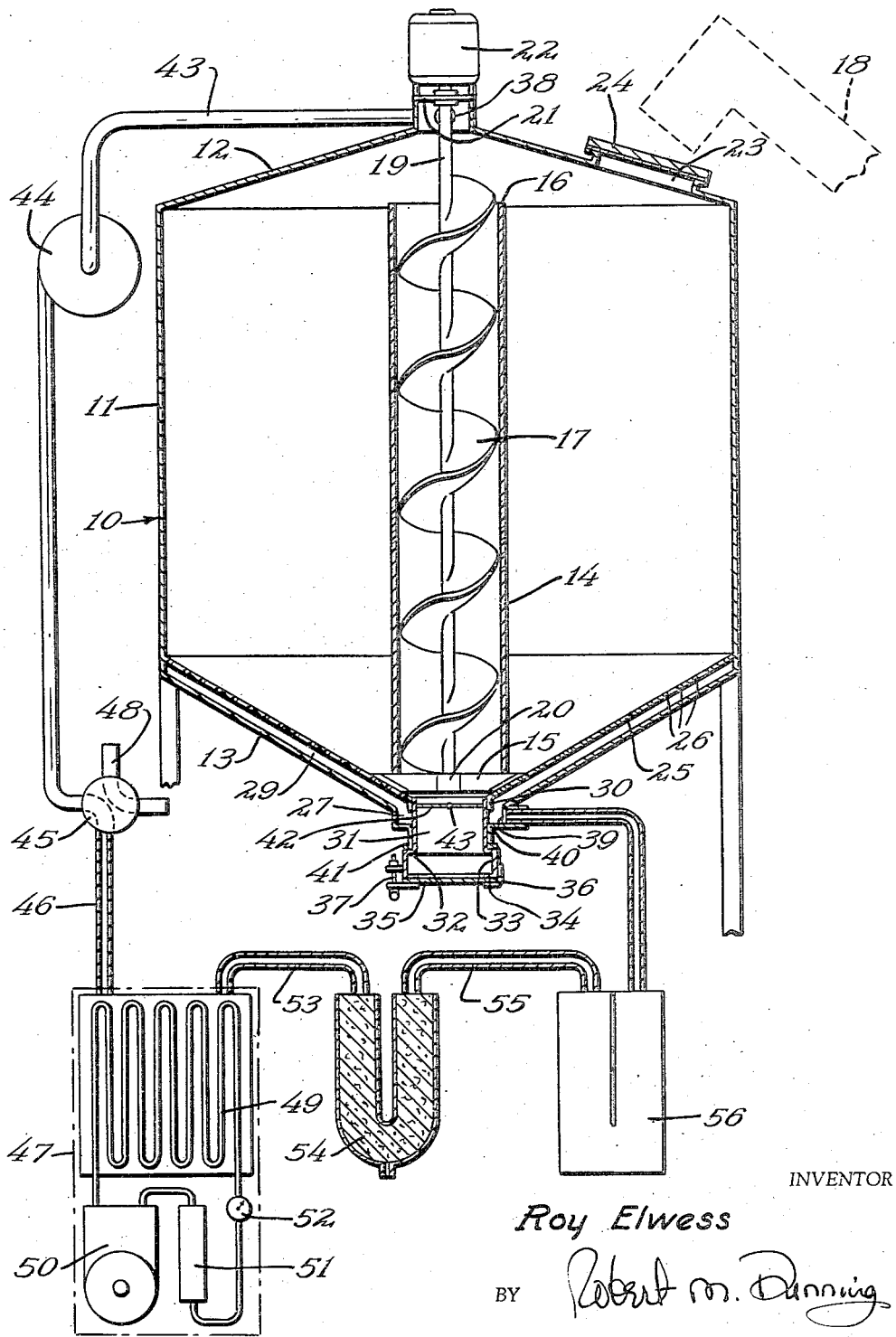

2,799,947
METHOD OF DRYING GRAIN
Roy Elwess, Minneapolis, Minn.
Application March 30, 1954, Serial No. 419,775
5 Claims. (Cl. 34—15)

This invention relates to an improvement in moisture extractor and deals particularly with an apparatus for reducing the moisture content of grain and similar materials.

Various types of devices have been employed for the purpose of removing moisture from grain. Most of these devices drive the moisture from the grain by heating it to as high a temperature as is possible. While such a method does tend to drive moisture vapor from the grain, when the grain cools it tends to reabsorb the moisture from the surrounding air. Such systems being, for example, wherein the grain is dried in one place and immediately transferred to conventional storage bins while the temperature of the grain is still comparatively high. A purpose of the present invention is to avoid these previous difficulties and develop a process that will permit the use of lower temperatures in the drying operation.

An object of the present invention lies in the removal of moisture from grain and the like by withdrawing moisture laden air from the mass of grain and replacing this moisture laden air with dry air. This may be accomplished either by circulating the air removed through a suitable dehumidifying device or by exhausting the moisture laden air to atmosphere and replacing it with air which has been dehumidified.

A feature of the present invention resides in providing a grain drier which comprises a tank capable of withstanding pressure caused by creating a partial vacuum within the tank, thus removing moisture laden air. This air is then replaced with dry air and the temperature may correspond with the temperature of the atmosphere. Thus when the grain is removed from the tank, the tendency to absorb moisture present in the free air by reason of a change in temperature of the material is avoided.

These and other objects and novel features of my invention will be more clearly and fully set forth in the following specification and claims.

In the drawings forming a part of the specification:

The drawing shows diagrammatically a grain drying device and system.

In drying the grain a tank or enclosure 10 is provided which is capable of supporting the grain while it is subjected to partial vacuum. The air evacuating system, as hereinafter described, creates a suction effect above the grain mass, thereby causing a partial vacuum or reduction of pressure above the grain mass. The tank 10 is shown as being a generally cylindrical wall 11 including a top 12 and a substantially conical bottom 13. The specific shape of the tank is not of utmost importance.

The tank 10 is provided with a vertically extending centrally located tube or sleeve 14 which is supported by a spider or other suitable supporting means 15 which holds the lower end of the tube elevated from the bottom 13 of the tank. The upper end 16 of the tube 14 is open and the tube includes a vertical spiral conveyor 17 mounted upon a shaft 19 which extends through the axis of the tube 14. The lower end of the shaft 19 is shown as supported in a bearing 20 forming a part of the support 15. The shaft 19 extends through a seal 21 at the upper end of the tank and is connected to a motor 22 by means of which the shaft and spiral conveyor may be rotated. Rotation of the conveyor 17 acts to elevate grain in the sleeve 14, the grain passing through the open upper end of the sleeve 14 and dropping into the tank externally of the sleeve. In other words, the conveyor acts to circulate the grain during the drying process.

The tank top 12 is provided with an opening 23 which is normally closed by a closure 24. The opening 23 permits the tank to be filled by any suitable grain entering conveyor 18 or the like.

A conical baffle 25 is provided within the tank spaced from the bottom 13. The baffle 25 is provided with perforations 26 extending therethrough. The perforations 26 are smaller than would be required to permit the grain to pass therethrough but are large enough to permit the free passage of air. In other words, the false bottom baffle 25 supports the grain but permits air to enter the body of grain by passing therethrough. A manifold 27 is provided at the lower end of the tank in communication with the space 29 between the baffle 25 and the tank bottom 13. The baffle 25 is provided with a cylindrical flange 30 at its lower extremity coaxial with the sleeve 14. A sleeve 31 fits within the flange 30 and seals with respect thereto. The sleeve 31 is connected by a ring shaped portion 32 to a larger diameter sleeve 33 terminating in an inturned flange 34 at its lower end. A closure 35 is pivoted at 36 to the sleeve 34 and is held in closed position by a suitable locking mechanism 37.

The bottom of the tank 13 is provided with a cylindrical flange 39 at its lower extremity which is of larger diameter than the flange 30 and encircles the same to provide the manifold 27 therebetween. The lower end of the flange 39 is connected by a ring shaped plate 40 to a sleeve 41 which fits snugly about the sleeve 31. The lower end of the sleeve 41 seals against the shoulder formed by the ring shaped portion 32.

A closure panel 42 is centrally pivoted at 43 to the sleeve 31 and may be swung from the closed position illustrated to an open position to permit grain to drop through the sleeves 31 and 33 and through the lower end thereof when the tank is to be emptied.

An exhaust manifold 38 is provided at the upper end of the tank encircling the conveyor shaft 19. An exhaust pipe 43 is connected to the manifold 38 and leads to the inlet of a fan or blower 44 which is capable of reducing the pressure within the tank 10. The outlet of the blower 44 may be connected to a valve diagrammatically illustrated at 45. This valve, in the position shown directs air to a tubular connection 46 leading to a moisture removing apparatus 47. Alternatively, the valve 45 may be rotated to connect the blower outlet 44 to an outlet pipe 48 leading to atmosphere, and the valve 45 simultaneously connects the tubular connection 46 to atmosphere through a right angularly arranged inlet in the valve casing. Thus, the air removed from the top of the tank may either be treated and returned to the tank, or may be exhausted to atmosphere. In the latter case, atmospheric air is introduced into the tank inlet, after passing through a treatment which will be described.

The drying apparatus 47 is shown as including a refrigerant coil 49 in heat transfer relation to the air, the coil 49 acting to reduce the temperature of the air. The refrigerant coil 49 is connected to a conventional refrigerating system which is shown diagrammatically as including a compressor 50, a condenser 51, and an expansion valve or capillary tube 52.

The cooled air may leave the refrigerator through a conduit 53 which leads to a diagrammatically illustrated collection device 54 which acts to remove moisture from the cooled air. It is obvious that when the air is cooled a percentage of the moisture contained therein will condense from the air and the condensor 54 is designed to collect this moisture and remove it from the air. The condensed moisture is drained away in any suitable manner.

The air is then permitted to pass through a conduit 55 and into a heater 56 which heats the air by any suitable means. The heater may include heated plates or panels with which the air comes in contact. The heater 56 normally does not heat the air to a temperature considerably above normal atmospheric temperature but usually is maintained sufficiently low so that the properties of the grain are not substantially changed. In other words, the heater 56 may only heat the air to its normal temperature before the start of the cooling operation.

During the operation of the drying process the conveyor 17 may circulate the grain in order to thoroughly dry it. The conveyor raises the center portion of the grain and allows it to spill over the upper end of the top 14 back into the body of the tank. The operation of the apparatus is simple. The blower 44 and the motor 22 are set into operation, the blower 44 removing part of the air from the tank and thus withdrawing moisture laden air from the tank. Either simultaneously or at a later time, air is forced through the refrigerating unit 47, a portion of the moisture being removed from the air. The air passes through a filter or condensor 54 which separates the moisture from the air. The air is then heated in the heater 56 and returned to the tank. The temperature of the returning air may be maintained below the temperature at which the quality of the grain is reduced and if desired the heater may only heat the air to its original temperature.

There are many advantages in the present system over conventional systems. In the first place, the heat used in drying grain often affects the germination of the grain. In order to thoroughly heat the entire body of grain the temperature is increased to a point where at least part of the grain is adversely affected. Furthermore, with usual heating methods, considerable shrinkage occurs.

Difficulty is also experienced in heating the grain uniformly through an entire mass. With the present arrangement, when air in the tank is exhausted, the pressure is uniform throughout the body of grain and, accordingly, the moisture removed is more uniform than with other systems. Furthermore, when dry air is inserted in the tank to replace the exhausted moisture laden air, the dry air is drawn uniformly through the mass of grain thus producing a more uniform drying operation than is usually possible.

One of the advantages of agitating the grain during the drying operation lies in the fact that dust and dirt is separated from the grain and is removed with the air drawn from the receptacle. This cleaning operation can be enhanced by inserting small abrasive pellets of a desirable size in the grain. These pellets scour or burnish the particles of grain and brighten the contents to any desired degree. These pellets may be of a size sufficiently different from that of the particles of grain to permit easy separation when the grain is emptied. Furthermore, the abrasive pellets may be caged or pocketed in the tank so that they may be removed when desired during the drying cycle.

A further advantage of the present system lies in th fact that prior to the removal of the air fungicide materials, grain protective materials or coating materials may be introduced and these materials will be thoroughly distributed as the air is exhausted.

As a modified form of treatment, the air may first be exhausted from the tank and chemicals or coating materials may be inserted in the air entering the tank. After a suitable time this air may again be exhausted and replenished with pure air.

The purpose of the bottom construction of the tank is to permit easy emptying and easy cleaning of the grain. After the grain has been dried, it may be removed by opening the closure 35 and pivoting the closure 42 into open position. If it is desired to clean the dust and dirt from the bottom of the tank, the entire closure portion including the sleeve 31 may be removed so that the manifold 27 and the space 29 between the bottom 13 and the baffle 25 can be cleaned.

In accordance with the patent statutes, I have described the principles of construction and operation of my grain drier and while I have endeavored to set forth the best embodiment thereof, I desire to have it understood that obvious changes may be made within the scope of the following claims without departing from the spirit of my invention.

I claim:

1. The method of drying grain without materially affecting the germination qualities or kernel size thereof, the method consisting in forming a confined bed of grain, subjecting the bed of grain to partial vacuum by withdrawing air and moisture from one side of the bed, cooling the removed air to a temperature substantially below the temperature of the grain, condensing and removing moisture from the cooled air, reheating the air to substantially the temperature of the grain, and returning the dried and reheated air to the other side of said bed of grain, whereby the grain is dried at substantially ambient air temperature.

2. The method of treating grain to improve the quality thereof without materially affecting the germination thereof due to sudden variations in temperature, the method consisting in forming a confined bed of grain, subjecting the bed to partial vacuum by withdrawing air from said one side of said bed, refrigerating air substantially below the temperature of the air removed, condensing moisture from the refrigerated air, reheating the refrigerated air, and conveying the reheated air to the other side of the confined bed of grain to take the place of air being removed from said one side of the bed of grain.

3. The method described in claim 2 and including the further step of agitating the bed of grain, adding abrading elements to the grain for agitation therewith, and removing the abrading elements at the completion of the process.

4. The method of claim 2 and including the further step of adding grain treating chemicals to the air conveyed to the other side of the grain bed.

5. The method of treating grain to improve the quality thereof without materially affecting the germination thereof due to sudden variations in temperature, the method consisting in forming a confined bed of grain, subjecting the grain bed to partial vacuum by withdrawing air from said one side of said bed and replacing it with other air supplied to the other side of the grain bed, this other air being at a temperature not substantially higher or lower than the grain temperature, said other air being formed by refrigerating the air at a temperature substantially below the grain temperature, removing moisture and impurities from the air, and reheating the air to substantially the grain temperature.

References Cited in the file of this patent

UNITED STATES PATENTS

| | | |
|---|---|---|
| 212,955 | Luckenbach | Mar. 4, 1879 |
| 683,269 | Gardner | Sept. 24, 1901 |
| 1,277,895 | Foster | Sept. 3, 1918 |
| 2,080,179 | Merriam et al. | May 11, 1937 |
| 2,207,360 | Spellacy | July 9, 1940 |
| 2,634,513 | Ladd et al. | Apr. 14, 1953 |